US010117383B2

(12) United States Patent
Lagaese

(10) Patent No.: US 10,117,383 B2
(45) Date of Patent: Nov. 6, 2018

(54) AUGER FINGER ASSEMBLY FOR A HARVESTING MACHINE

(71) Applicant: CNH Industrial America LLC, New Holland, PA (US)

(72) Inventor: Niko Lagaese, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 311 days.

(21) Appl. No.: 15/078,750

(22) Filed: Mar. 23, 2016

(65) Prior Publication Data

US 2016/0278292 A1 Sep. 29, 2016

(30) Foreign Application Priority Data

Mar. 24, 2015 (BE) .................................. 2015/5181

(51) Int. Cl.
*A01D 61/00* (2006.01)
*A01D 57/00* (2006.01)
*A01D 101/00* (2006.01)

(52) U.S. Cl.
CPC .......... *A01D 61/008* (2013.01); *A01D 57/00* (2013.01); *A01D 2101/00* (2013.01)

(58) Field of Classification Search
CPC .. A01D 61/008; A01D 57/00; A01D 2101/00; A01D 41/10; A01D 42/02; A01D 57/02; A01D 57/03; A01D 57/12; A01D 57/28; A01D 78/02; A01D 78/005; A01D 78/006; A01D 78/008; A01D 78/04; A01D 78/08; A01D 78/1064; A01D 78/14; A01D 80/02; A01D 89/00–89/008; A01D 7/00–7/10

USPC ................................ 198/612, 613, 659, 676
See application file for complete search history.

(56) References Cited

U.S. PATENT DOCUMENTS

| 2,633,231 A | * | 3/1953 | Pilcher | ................. | A01D 61/008 198/693 |
| 2,701,634 A | * | 2/1955 | Thomas | ............... | A01D 61/008 198/518 |
| 2,849,103 A | * | 8/1958 | Scheffter | .............. | A01D 61/008 198/513 |

(Continued)

FOREIGN PATENT DOCUMENTS

EP     1205101 A1    5/2002

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

An auger finger assembly. The assembly includes an excenter shaft configured to be mounted inside a rotatably driven tubular auger body and parallel and excentric to a central rotation axis of the auger body. The assembly further includes a plurality of auger fingers, each extending along a central longitudinal axis, and a plurality of finger holders mounted adjacent to each other on the excenter shaft along the direction of the rotation axis. Each of the plurality of finger holders includes an axial finger bearing at least partly enclosing the excenter shaft and a radial finger seat configured to hold a respective one of the plurality of auger fingers at an inward end. Along a direction of the rotation axis, the radial finger seat of each of the plurality of finger holders at least partly overlaps with the axial finger bearing of an adjacent one of the plurality of finger holders.

20 Claims, 7 Drawing Sheets

(56) References Cited

U.S. PATENT DOCUMENTS

| | | | |
|---|---|---|---|
| 3,142,375 A * | 7/1964 | Luke | A01D 61/008 |
| | | | 198/613 |
| 4,271,956 A * | 6/1981 | Hutchinson | B65G 65/22 |
| | | | 198/613 |
| 5,620,083 A * | 4/1997 | Vogelgesang | A01D 61/008 |
| | | | 198/613 |
| 6,158,571 A * | 12/2000 | Gosa | A01D 61/008 |
| | | | 198/613 |
| 6,244,955 B1 | 6/2001 | Bischoff et al. | |
| 6,986,241 B2 | 1/2006 | Beck | |
| 7,392,646 B2 * | 7/2008 | Patterson | A01D 61/008 |
| | | | 198/613 |
| 7,401,457 B2 | 7/2008 | Bich et al. | |
| 8,091,327 B2 * | 1/2012 | Batu | A01D 89/002 |
| | | | 198/613 |
| 2014/0237979 A1 * | 8/2014 | Yanke | A01D 61/008 |
| | | | 56/181 |

* cited by examiner

AUGER FINGER ASSEMBLY FOR A HARVESTING MACHINE

CROSS REFERENCE TO RELATED APPLICATION

This application claims priority to Belgium Application BE2015/5181 filed Mar. 24, 2015, which is incorporated herein by reference in its entirety.

FIELD OF THE INVENTION

The invention relates to an auger finger assembly for use in a harvesting machine, more particularly for use in a rotatable auger assembly as for example in use a suitable header, pickup, etc., of a combine harvester, forage harvester, agricultural baler, etc. or any other suitable crop infeed device that makes use of a rotatably driven auger assembly in any other suitable harvesting machine.

BACKGROUND OF THE INVENTION

A combine harvester making use of a header with a rotatably driven auger assembly that comprises an auger finger assembly is for example known from EP1749436. FIG. 1 of EP1749436, which is hereby incorporated by reference, shows a simplified side view of a grain header supported on a feeder on the front end of an agricultural combine harvester. In dotted lines there is further shown a rotatable auger assembly of the header. This known rotatable auger assembly comprises an auger finger assembly that comprises multiple auger fingers extending radially outwardly from a rotatably driven tubular auger body at axially and angularly spaced locations. The elongate auger fingers thereby extend from an inwards end through a corresponding opening in the auger body to an opposing outwards end outside the auger body.

As shown in more detail in FIG. 3 of EP1749436 each of the multiple auger fingers is individually mounted by means of a corresponding multiple of finger holders to an excenter shaft. This excenter shaft is mounted inside the auger body and is arranged parallel to and eccentric with respect to the central rotation axis of the auger body, so that the auger fingers make a suitable rotating and telescopic motion during the rotation of the auger body for conveying the crop towards a feeder of the combine harvester. These finger holders are arranged side by side along the axial direction of the excenter shaft, and generally comprise a T shaped structure. Each finger holder comprises a finger bearing with an internal opening in which the excenter shaft can be introduced such that the central axis of the excenter shaft is aligned with the central axis of the internal opening. In this way the finger holder is mounted to the excenter shaft in a way that allows for rotation of the finger holder around the central axis of the excenter shaft. Further the finger holder comprises, attached to this axial finger bearing, a radial finger seat, which an inwards end of the auger finger is mounted. This radial finger seat encloses a generally cylindrical cavity in which the inwards end of the auger finger can be mounted. The central axis of this cylindrical cavity in this way extends radially outward with respect to the excenter shaft, and is generally aligned with central axis of the elongate auger finger, which extends from its inwards end, radially outward with respect to the excenter shaft, through the corresponding opening of the auger body, to its opposing outwards end. Preferably, in order to allow for a secure mounting of the auger finger, that is able to withstand the loads exerted on the finger when performing its crop conveying function, preferably the finger seat encloses the auger finger at the inwards end of the finger over a predetermined length along the length direction of the auger finger, so that a robust and secure mounting is provided.

It is clear that the finger holder must not only allow rotation of the auger finger with respect to the rotation axis, but must also allow for a relative rotational movement of each individual auger finger with respect to the adjacent auger fingers along the axial direction of the excenter shaft. As shown in EP1749436, in order to allow for this relative rotational movement of adjacent auger fingers without the risk of interference of their adjacent finger holders, the width of the axial finger bearing along the direction of the rotation axis is larger than the width of the radial finger seat. It is clear that in this way the maximum number of auger fingers that can be mounted adjacent to each other on a predetermined length of the excenter shaft is limited.

However as the capacity of harvesting machines increases and a more even distribution of the crop flow into the harvesting machine is desired in order to improve the efficiency of downstream processing by the harvesting machine it is desired to provide for an increased number of auger fingers suitable radially and axially distributed along the auger body.

An alternative auger finger assembly is for example known from EP1183939 in which the auger fingers are not individually mounted to the excenter shaft but in a grouped way on three radially distributed finger mounting bars that extend longitudinally parallel to the excenter shaft and are each rotatably mounted to the excenter shaft by means of three axially distributed bearings. The mounting bars however limit the flexibility in the radial distribution of the auger fingers, as it will be difficult to provide for auger fingers at more than the three radial locations of the embodiment shown without causing interference of adjacent mounting bars caused by their relative rotational movement during the rotation of the auger body. Additionally all auger fingers of each of a single mounting bar need to be provided at the same radial location, thereby leading to a less uniform crop flow. Still further the additional elements of the mounting bars increase complexity of the construction thereby complicating assembly and maintenance of the auger finger assembly and further increases the inertia of the auger finger assembly, which leads to higher forces and torques impacting the elements of the auger finger assembly and the need for an increase in the required driving power to be provided by the rotational drive of the auger assembly, especially in the context of higher rotational speeds associated with an increasing capacity of the harvesting machines.

Therefore, there still exists a need for an improved auger finger assembly that overcomes the abovementioned drawbacks and is able to provide for a simple, robust and efficient auger finger assembly that allows for an increase in the capacity and efficiency of the harvesting machine.

SUMMARY OF THE INVENTION

According to a first aspect of the invention there is provided an auger finger assembly comprising an excenter shaft and multiple finger holders. The excenter shaft is configured to be mounted inside a rotatably driven tubular auger body. The excenter shaft comprises a central longitudinal axis parallel and excentric to a central rotation axis of the auger body. The multiple finger holders are mounted adjacent to each other on the excenter shaft along the direction of the rotation axis, and each finger holder is configured to individually mount an auger finger. Each finger holder comprises an axial finger bearing at least partly enclosing the excenter shaft and a radial finger seat radially projecting from the axial finger bearing and configured to hold an associated auger finger extending along a central longitudinal axis at an inwards end. Along the direction of the rotation axis, the radial finger seat of each of the finger holders at least partly overlaps with the axial finger bearing of at least one of its adjacent finger holders.

In this way, as the finger holders individually mount the auger fingers to the excenter shaft there is provided for a simple and robust auger finger assembly that allows for flexibility in the axial and radial distribution of the auger fingers, while allowing for an increase in the capacity and efficient of the harvesting machine as for a predetermined length of the excenter shaft a larger amount of auger fingers can be provided because of the overlap of the radial finger seat with the finger bearing of at least one of its adjacent finger holders.

According to an embodiment, along the direction of the rotation axis, for each of the finger holders, the distance between the central longitudinal axes of its finger and the finger of at least one of its adjacent finger holders, is smaller than the width of its finger seat.

The reduction of this distance allows for arranging a larger number of auger fingers for a predetermined length of the excenter shaft while the width of the finger seat still assures a sufficient robust mounting for the auger finger.

According to a further embodiment this distance between the central longitudinal axes of its finger and the finger of at least one of its adjacent finger holders is less than 90%, for example in the range of 20% to 80%, of the width of its finger seat.

This allows for a sufficient increase in the number of finger holders, such that it has a noticeable improvement on the level and uniformity of the crop flow.

According to a further embodiment, along the direction of the rotation axis, the mean distance between the central longitudinal axes of the adjacent fingers of adjacent finger holders, is smaller than the width of their finger seat.

According to a further embodiment this mean distance is less than 90%, for example in the range of 20% to 80%, of the width of their finger seat.

According to a further embodiment, along the direction of the rotation axis, the radial finger seat of each of the finger holders that comprises two adjacent finger holders, at least partly overlaps with the finger bearing of one of its adjacent finger holders.

In this way a simple arrangement of pairwise overlap of two adjacent finger holders allows for a maximum of flexibility of relative movement with respect to the adjacent finger holder with which there is no overlap.

According to a further embodiment, along the direction of the rotation axis, the radial finger seat of each of the finger holders that comprises two adjacent finger holders, at least partly overlaps with the finger bearing of both of its adjacent finger holders.

In this way a uniform and simple arrangement of the sequence of adjacent finger holders is made possible. Furthermore, distribution of the overlap at both sides of the finger holder results in a balanced arrangement which is more or less mirror symmetrical with respect to the longitudinal axis of the auger finger when mounted thereby reducing any torsional forces acting on the finger holder during operation.

According to a further embodiment, each of the finger holders is configured such that, along the direction of the rotation axis, the width of the axial finger bearing is smaller than the width of the radial finger seat.

In this way the overlap can be realized in a simple and efficient way, allowing for a robust mounting of the auger finger by means of the wider radial finger seat.

According to a further embodiment, the finger holders are configured such that along the direction of the rotation axis: the axial finger bearing extends between two outer ends, the width of said axial finger bearing being the distance between said outer ends; the radial finger seat extends between two outer ends, the width of said radial finger seat being the distance between said outer ends; and at least one of the outer ends of the axial finger bearing is positioned in between the outer ends of the finger seat of a respective, overlapping adjacent finger holder.

In this way the overlap of axially adjacent finger holders can be realized in a simple way.

According to a further embodiment, the finger holders are configured such that along to the direction of the rotation axis the axial finger bearing sequentially comprises: a first axial bearing section extending from its first outer end to a first intermediate end; an axial opening extending between the first intermediate end to a second intermediate end; and a second axial bearing section extending from the second intermediate end to its second outer end, the width of the axial opening being equal to or larger than the width of the first or second axial bearing section; and in the axial opening there is positioned the first or second axial bearing section of a respective, overlapping adjacent finger holder.

In this way a balanced arrangement of the finger holder on the excenter shaft is possible, while still allowing for the increased flexibility of a pairwise overlap.

According to a further embodiment the auger finger assembly further comprises: a tubular auger body comprising a corresponding multiple of openings for the multiple of auger fingers of the multiple of finger holders; and a corresponding multiple of auger fingers, each extending from its inwards end, held at the radial finger seat of its associated finger holder, along its longitudinal axis through its associated opening in the tubular auger body, to its outward end.

In this way the auger finger assembly is further provided with a suitable auger body and auger fingers.

According to a further embodiment the multiple openings of the tubular auger body are positioned such that the corresponding openings of auger fingers of axially adjacent, overlapping finger holders are not in an adjacent angular position with respect to the rotation axis.

In this way interference of radial auger seats of overlapping adjacent finger holders is avoided in a simple and efficient way, even when the relative angle between these adjacent finger holders varies during operation of the auger finger assembly.

According to a further embodiment the auger finger assembly comprises a plurality of subgroups, each subgroup comprising a subset of four, five, six, seven, or more adjacent finger holders of which the associated auger fingers and openings are distributed angularly along a single revolution of the circumference of the auger body; and in that the angular positions of the respective auger fingers and openings of different subgroups differ from each other.

This increased number of auger fingers distributed along both the axial direction and along the circumference of the auger body provides for an increase in the amount and uniformity of the crop flow and still further the increased flexibility and variety of the specific arrangement of these auger fingers still further improves uniformity of the crop flow.

According to a second aspect of the invention there are provided finger holders for use in an auger finger assembly according to the first aspect of the invention, characterized in that, when mounted adjacent to each other on the excenter shaft, along the direction of the rotation axis, the radial finger seat of each of the finger holders at least partly overlaps with the finger bearing of at least one of its adjacent finger holders.

In this way a multiple of similar finger holders can be produced for use in the improved auger finger assembly thereby leading to a simple and efficient construction. This also allows for retrofitting these finger holders to an excenter shafts of existing auger finger assembly with only the need to prove new suitably arranged corresponding openings in the auger body.

According to a third aspect of the invention there is provided a method of manufacturing an auger finger assembly according to the first aspect of the invention, wherein the method comprises the steps of: mounting the excenter shaft inside the rotatably driven tubular auger body such that its central longitudinal axis is parallel and excentric to the central rotation axis of the auger body; mounting the multiple of finger holders adjacent to each other on the excenter shaft along the direction of the rotation axis, for individually mounting the auger fingers, and further mounting the multiple of finger holders, along the direction of the rotation axis, such that the radial finger seat of each of the finger holders at least partly overlaps with the axial finger bearing of at least one of its adjacent finger holders.

In this way a simple method of manufacturing the auger finger assembly which provides for an increased level and uniformity of the crop flow is realized.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 1:
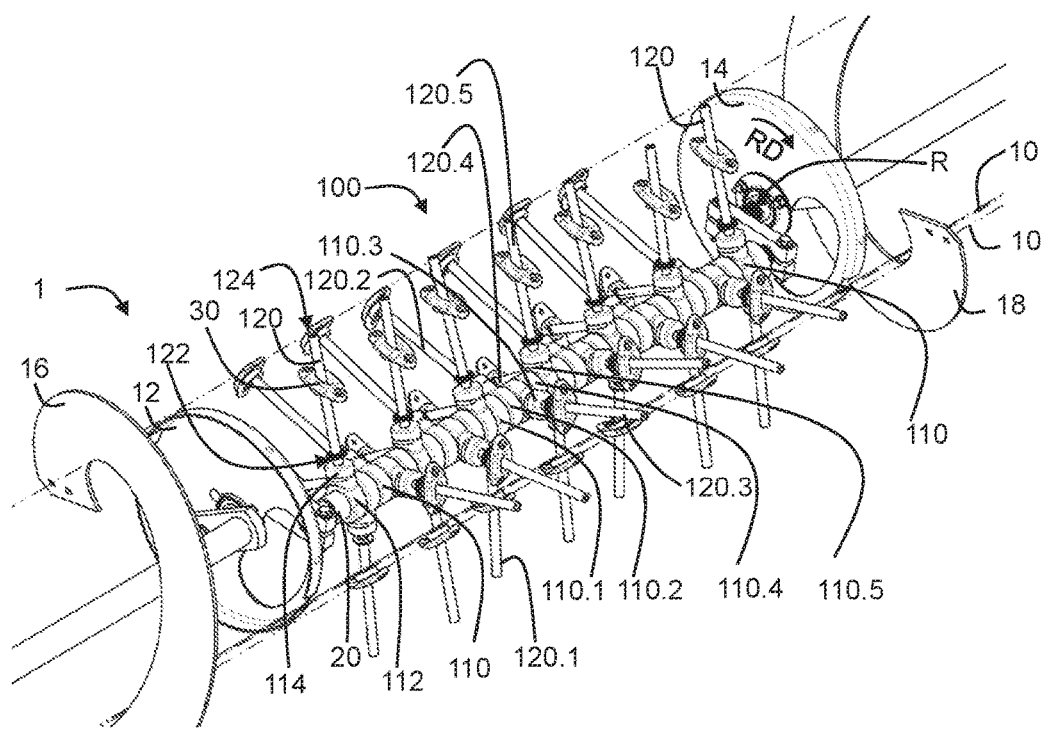
FIG. 1 schematically shows a perspective view of an auger body and an auger finger assembly comprising a plurality of finger holders, in accordance with an exemplary embodiment of the present invention.

FIG. 1 shows a schematic perspective view of an embodiment of a rotatable auger assembly 1 for a harvester, such as for example in use in a head or pickup of a combine harvester, a forage harvester, a baler, etc. The auger assembly 1 comprises a rotatably driven tubular auger body 10, of which the contour is only indicated with stripe double dot lines, in order to more clearly shown the elements mounted inside this auger body 10. The tubular auger body 10, as shown, is rotatably supported by means of radial discs 12 and 14 that connect the cylindrical, tubular auger body 10 to a suitable bearing on a central shaft that allows for the rotation of the auger body around a central rotation axis R along the central axis of the auger body 10. In this way the auger body 10, is rotatably driven along the direction of rotation RD by means of a suitable drive, for suitably conveying the crop during a harvesting operation. It is clear that for example in the case of an auger assembly 1 in use in a grain header of a combine harvester, similar as for example known from EP1749436, the crop which is cut from the field is conveyed, transverse to the driving direction of the combine harvester, by means of a left auger flight 16 and right auger flight 18 that project outwards from the outer surface of the tubular auger body 10, towards a central zone of the header in which a rotatable auger finger assembly 100 is provided, which engages the crop in order to provide for a crop flow generally along the driving direction of the combine harvester from the header towards a further downstream element, such as for example a feeder of the combine harvester.

Figure 2:
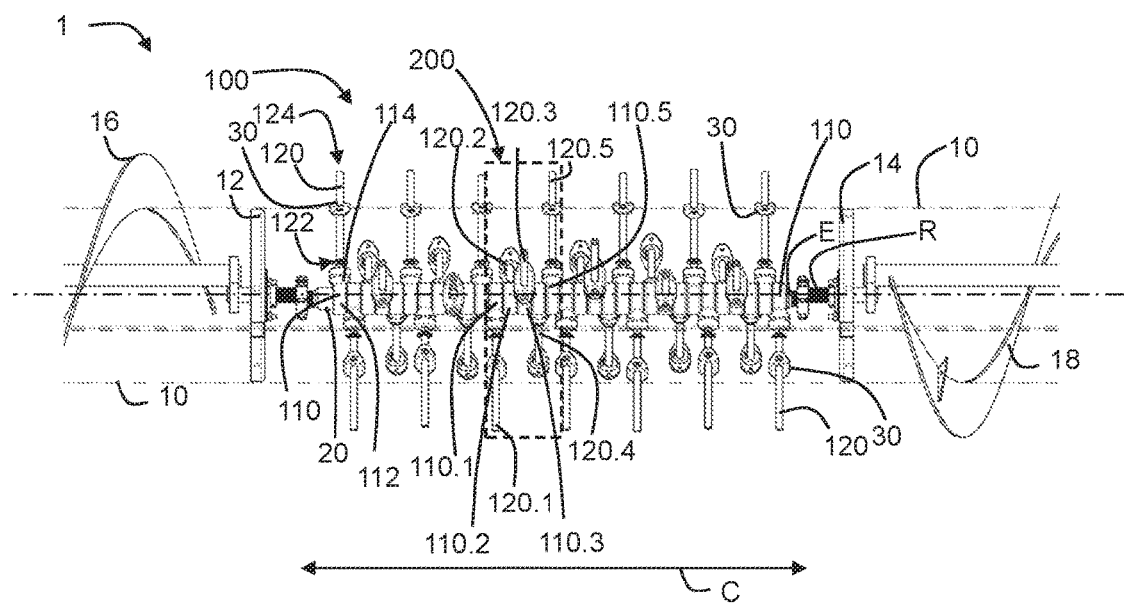
FIG. 2 schematically shows a front view of the auger finger assembly of FIG. 1, in accordance with an exemplary embodiment of the present invention.

According to the embodiment shown in FIG. 1 and more clearly shown in the front view of this embodiment in FIG. 2, the auger finger assembly 100 extends axially along the central axis of the auger body 10 along a central zone C in between both radial discs 12 and 14. In this axial auger finger zone C, there is provided an excenter shaft 20 to which a multiple of fingers 120 are individually mounted by means of finger holders 110. The excenter shaft 20 is mounted inside the rotatably driven tubular auger body 10. It is clear that although the auger body 10 is rotatably driven during the operation of the harvester, the excenter shaft 20 maintains a stationary position. This means that the excenter shaft 20 does not rotate around the central rotation axis R of the auger body 10. As shown, the excenter shaft 20 is mounted parallel and excentric to the central rotation axis R of the auger body 10. As shown more clearly for example in FIGS. 4 to 6, the excenter shaft 20 preferably comprises an elongate shaft with a generally circular cross section. The excenter shaft 20 thus extends axially along its central longitudinal excenter axis E parallel to the central rotation axis R of the tubular auger body 10.

In the axial auger finger zone C, there are provided multiple finger openings 30 that extend through the auger body 10. As will be explained in further detail below, the finger openings 30 of the auger body 10 are axially and radially distributed along the tubular auger body 10 in order to provide for a suitable distribution of the auger fingers 120 for allowing an optimal crop flow. A corresponding multiple of auger fingers 120 projects radially from the excenter shaft 20 through a corresponding finger opening 30 outwards of the tubular auger body 10. As shown, according to this embodiment there are provided thirty-two finger openings 30 and thirty-two corresponding auger fingers 120 in the axial auger finger zone C. According to a particular embodiment, in which the width of the axial auger finger zone C and the corresponding axial length of the excenter shaft 20 is for example approximately 1 m, for example in the range of 0.8 m to 1.2 m, and only allowed for a maximum of twenty-one auger fingers to be arranged by means of prior art finger holders. It is however clear that according to alternative embodiments another suitable number of auger fingers 120 and corresponding finger openings 30 could be provided. However, in order to increase the crop flow capacity and improve evenness of the crop flow, it is desired to achieve, for the available axial length of the excenter shaft 20 in the axial auger finger zone C, an as high number of auger fingers 120 as possible, as this allows to increase the number of axial and radial positions along the tubular auger body which can be provided with auger fingers 120, which increases the forces that can be exerted on the crop flow by the auger finger assembly and improves the uniformity of the distribution of these forces along the different axial and radial locations of the rotatable auger body 10 during a harvesting operation. The auger fingers 120, sometimes also referred to as tines, are elongate elements, such as for example a suitable metal rod, tube, wire, etc. of which the central longitudinal axis 120L extends radially with respect to the excenter shaft 20 as shown in FIG. 1. This means that the auger fingers 120 extend generally along their longitudinal direction in a plane transverse to the longitudinal axial direction E of the excenter shaft 20, and thus also to the parallel central rotation axis R of the auger body 10. The auger fingers 120, as shown, extend along their longitudinal axis 120L from an inwards end 122 positioned inside the auger body 10, through its corresponding auger opening 30, to an opposite outwards end 124 outwards of the auger body 10. As further shown, according to this embodiment the auger opening 30 is provided by means of a suitable guide element which provides for a suitably shaped guide surface around the auger opening 30 for guiding the auger finger 120 during its telescopic and pivoting motion relative to the tubular auger body 10 when the auger body 10 is rotatably driven around its rotation axis R, as also shown more clearly in FIGS. 4 to 6. The auger fingers 120 are each individually mounted on the excenter shaft 20 by means of an auger finger holder 110. As shown the auger fingers 120 are each individually mounted to the excenter shaft 20 at their inwards 120 by means of a corresponding finger holder 110. It is thus clear that each of the auger fingers 120 extends radially with respect to the excenter shaft 20 from its inwards end 122 mounted to the excenter shaft 20 inside the tubular auger body 10, through its corresponding auger opening 30, to its opposing outwards end 124 outside the auger body 10. It is thus further clear that the auger finger 120, its finger holder 110 and its finger opening 30 are all provided at the same axial position with respect to excenter shaft 20.

As shown in FIGS. 1 and 2, the multiple of finger holders 110 of the auger finger assembly 1, each mount their respective auger fingers 120 individually on the excenter shaft 20. This means that there are provided a same multiple of auger holders 110 as there are available auger fingers 120 in the auger finger zone C, which according to the embodiment shown means thirty-two auger finger holders 110, one for each of the thirty-two auger fingers 120. As further shown, this multiple of finger holders 110 is mounted adjacent to each other on the excenter shaft 20. This means that the finger holders 110 are mounted side by side along the longitudinal direction E of the excenter shaft 20, or alternatively formulated adjacent to each other along the direction of the rotation axis R.

Figure 3:
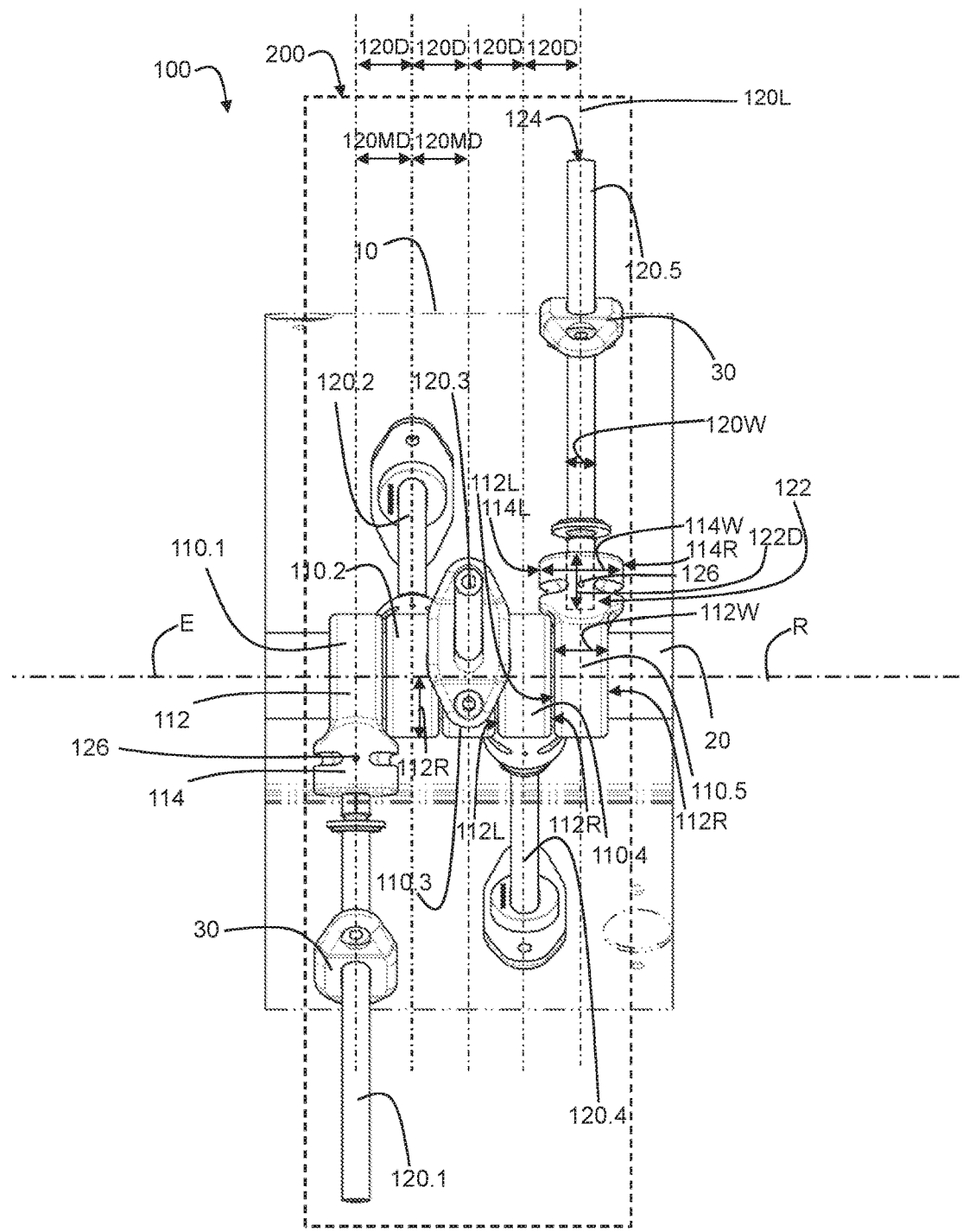
FIG. 3 schematically shows a subgroup comprising five auger fingers of the auger finger assembly of FIGS. 1 and 2 in further detail, in accordance with an exemplary embodiment of the present invention.

As further shown in FIGS. 1 and 2, and also more clearly in FIG. 3 that shows a subgroup 200 of this embodiment of the auger finger assembly 100 comprising five adjacent finger holders 110.1-110.5, each finger holder 110 individually mounts its respective auger finger 120.1-120.5 to the excenter shaft 20. A single finger holder 110 thus mounts a single auger finger 120 to the excenter shaft 20. As shown, this embodiment of the finger holder 110 comprises a radial finger seat 114 that holds the associated auger finger 120 at its inwards end 122. This radial finger seat 114 projects radially from an axial finger bearing 112 of the finger holder 110, meaning transverse to the excenter shaft 20 and along a radial direction with respect to the central longitudinal axis E of the excenter shaft 20. The axial finger bearing 112 of the finger holder 110 rotatably mounts its radial finger seat 114 to the excenter shaft 20.

As shown, the axial finger bearing 112 has a more or less annular, or tubular shape that encloses the excenter shaft 20 and thus rotatably mounts the radial finger seat 114 to the excenter shaft 20, such that it is able to perform a rotary motion in a plane transverse to the central longitudinal axis E of the excenter shaft 20, and thus also transverse to the parallel central rotation axis R. As most clearly shown in the side views of FIGS. 4 to 7 and also in the perspective view of FIG. 9, the tubular or annular shape of the axial finger bearing 112 comprises a central cylindrical opening 111 which encloses the matching circular cross section of the excenter shaft 20. It is clear that in this way the central longitudinal axis of the central cylindrical opening 111 is aligned with the central longitudinal axis of the excenter shaft 20 which it encloses. It is further clear that according to the embodiment shown the axial finger bearing 112 performs its bearing function with respect to rotation around the excenter shaft 20 as a plain bearing. In order to reduce friction the finger holder could for example be manufactured from a suitable solid polymer such as for example nylon, polyacetal, polytetrafluoroethylene (PTFE), ultra-high-molecular-weight polyethylene (UHMWPE), rulon, PEEK, urethane, etc. that exhibit low friction with respect to the excenter shaft 20 which is for example made of a suitable metal such as for example steel. This also allows for a the finger holder 110 to be manufactured by means of an suitable injection molding process, which allows for an efficient manufacturing process for the desired shape of both the finger bearing 112 and the radial finger seat 114. Additionally, a suitable amount of play between the central cylindrical opening 111 and the excenter shaft 20 could be provided in order to enable an efficient, low wear bearing function. However, it is clear that according to alternative embodiments, the axial finger bearing 112 could be manufactured in any other suitable way, for example comprising a suitable metal, ceramic, etc. and could perform its bearing function in any other suitable way, for example by means of a suitable ball bearing, roller bearing, bushing, etc. The radial finger seat 114, which projects radially from the axial finger bearing 112. This means that the radial finger seat 114 comprises a central longitudinal axis according to a plane transverse to longitudinal axis E of the excenter shaft 20, also comprises a tubular or annular shape comprising a central opening 115, which will be more clearly shown with reference to for example FIGS. 8 and 9, of which the cross section matches that of the cross section of the auger finger 120. According to the embodiment shown in FIG. 3, the radial central opening 115 of the radial finger seat 114 encloses the inwards end 122 of the auger finger 120 over a distance 122D along the longitudinal direction 120L of the auger finger 120. This thus means that the auger finger 120 protrudes into the radial finger seat 114 of its finger holder 110 over this distance 122D along its longitudinal axis 120L at its inwards end 122. As shown, the auger finger 120 can be fixed to its finger holder 110 by means of a transverse pin or clips that can be introduced into a transverse bore 126 or opening that passes, transverse to their longitudinal axis, through both the radial finger seat 114 and the introduced inwards end 122 of the auger finger 120 when mounted therein, thereby connecting the auger finger 120 to its finger holder 110. The distance 122D over which the auger finger 120 protrudes into its finger seat 114 of its finger holder 110, is sufficiently long to allow for a secure mounting of the auger finger to the finger seat 114, for example in the range of 5% to 20% of the overall length of the auger finger 120.1

As in this embodiment the auger finger 120 comprises a cross section with a circular outer circumference with an outer radius 120W. The radial central opening 115 of the radial finger seat 114 will comprise a mating inner radius which allows insertion of the inwards end 122 of the auger finger 120 along the direction of its longitudinal axis 120. The radial finger seat 114, as shown, encloses this central opening 115 by means of a cylindrical, annular collar 113 of which the outer diameter 114W is larger than the outer radius 120W of the auger finger 120. According to this embodiment, the central axis of the annular collar 113 is aligned with the central axis of the radial central opening 115. The wall thickness of this annular collar 113 of the of the radial finger seat 114 that encloses the central opening 115 and thus the inserted inwards end 122 of the auger finger 120, is preferably large enough to reliably hold the auger finger 120 even when subjected to an increased load associated with an increased level of crop flow. This means that, along the direction of the rotation axis R, or along the direction of the parallel central longitudinal axis E of the excenter shaft 20, as clearly shown in for example the view of FIGS. 2, 3 and 8, the width 114W of the finger seat 114 is larger than the width 120W of the auger finger 120 and the associated central opening 115 of the finger seat 114. In the embodiment shown the width 114W of the finger seat along the direction of the rotation axis R, or the longitudinal axis E of the excenter shaft 20, is for example three times the width 120W of the auger finger 120. However, it is clear that according to alternative embodiments, any suitable ratio, for example in the range of two times to five times the width 120W of the auger finger 120, would provide for a suitable width 114W of the finger seat 114. Although the annular, cylindrical shape of the radial finger seat 114 is advantageous, as it decreases the chance of stress concentrations at particular locations of the finger seat 114 during, other shapes for the radial finger seat 114 are possible as long as its longitudinal axis extends radially with respect to the excenter shaft 20. Additionally, also the cross section of the central opening 115 and the corresponding cross section of the auger finger 120 transverse to its longitudinal axis 120L could have an alternative shape other than the tubular cross section with a circular outer circumference of the embodiment shown. Alternative shapes for the outer circumference of the cross section could for example be a suitable ellipsoid, a suitable polygon such as for example a suitable triangle, square, rectangle, pentagon, hexagon, etc. or any suitable shape comprising a combination of curves, straight lines and/or angles. Also, when considering these alternative embodiments, it is preferable to ensure a sufficient wall thickness for the material of the radial finger seat 114 that forms the collar 113 enclosing the central opening 115 and the inserted inwards end 122 of the finger seat 120, and thus, along the direction of the rotation axis R, the width 114W of such a finger seat 114 is preferably larger than the width 120W of the auger finger 120 as explained above. It is clear that still further alternative embodiments for the auger finger 120, instead of the tubular cross section as shown, the auger finger 120 could for example be embodied as a solid rod comprising a solid cross section.

Although, as shown the axial finger bearing 112 is formed as a tubular or annular cylindrical element comprising a central cylindrical opening 111 of which the central axis is aligned with the central axis E of the excenter shaft 20 when mounted, and which thus encloses the excenter shaft 20 entirely, alternative embodiments remain possible. As long as the axial finger bearing 112 at least partly encloses the excenter shaft 20, such that it is able to perform its bearing function, this means allowing the attached radial finger seat 114 and its connected auger finger 120 to rotate about the central longitudinal axis E of the excenter shaft 20 in a plane transverse to this central axis E of the excenter shaft 20 and thus also transverse to the rotation axis of the auger body 10. It should also be clear that, although the embodiment of the finger holder 110 shown is formed as a unitary element, such as for example a suitably cast, molded or worked plastic or metal element, there are possible alternative embodiments in which the finger holder is formed by means of two or more connected distinct elements. As long as in general, when mounted on the excenter shaft 20 by means of its axial finger bearing 112, the finger holder 120 comprises a radial finger seat 114 that radially projects from its axial finger bearing 112, which means that the radial finger seat 114 is able to hold an associated auger finger 120 at its inwards end 122 such that its longitudinal axis 120L projects radially from the excenter shaft 20, through its corresponding opening 30 in the auger body 10, towards its opposing outwards end 124 outwards of the auger body 10.

It is clear from the views shown in FIGS. 2 and 3, and as will be explained in further detail with reference to FIGS. 8 and 9, that along the direction of the rotation axis R, and thus also along the direction of the central axis E of the excenter shaft 20, the radial finger seat 114 of each of the finger holders 110 at least partly overlaps with the finger bearing 112 of at least one of its adjacent finger holders 110. This thus means that, along the direction of the rotation axis R, the width 112W of the axial finger bearing 112 of the finger holder 110, is smaller than the width 114W of the radial finger seat 114. As shown, the multiple finger holders 110 are arranged adjacent to each other on the excenter shaft 20, which means that the finger holders 110 are arranged in a sequential manner along the longitudinal axis E of the excenter shaft 20. It is clear from the view shown in FIGS. 2 and 3, that according to this embodiment, the finger bearings 112 of adjacent finger holders 110 are arranged such that they are adjacent to each other on the excenter shaft 20, thereby forming a sequence of adjacent tubular shaped sections, arranged side by side and enclosing the excenter shaft 20. When considering for example the subgroup 200 of this embodiment of the auger finger assembly 100 as shown in more detail in FIG. 3, this means that, with respect to the direction of the rotation axis R, the finger holder 120.2 is positioned in between two adjacent finger holders 120.1 to the left and 120.3 to the right. As shown, with respect to the direction of the rotation axis R, the leftmost outer end of the finger bearing 112 of finger holder 110.2 is positioned adjacent the opposing rightmost outer end of the adjacent finger holder 110.1, and similarly the rightmost outer end of the finger bearing 112 of finger holder 110.2 is positioned adjacent the opposing leftmost outer end of the other adjacent finger holder 110.3. The same holds for every subsequent finger holder 110 in this subgroup. This means that finger holder 110.3 is similarly arranged with respect to its adjacent finger holders 110.2 and 110.4, and also finger holder 110.4 is similarly arranged with respect to its adjacent finger holders 110.3 and 110.5. As shown in FIG. 3, for such a subgroup 200 comprising for example five finger holders 110 arranged adjacently on the excenter shaft 20, the total length of the excenter shaft 20 occupied by these finger holders 110 is determined by the width 112W of the adjacent finger bearings 112 of the adjacent finger holders 110.1-110.5. As shown the length of these five adjacent finger holders 110.1-110.5 occupied along the excenter shaft 20 is equal to or only slightly diverging from five times the width 112W of their axial finger bearings 112 which are sequentially arranged next to each other along the excenter shaft 20. It is clear that the same reasoning applies to the entire sequence of the multiple of adjacent finger holders 110 of the auger finger assembly 100 as shown in FIG. 2, which means that the length of the excenter shaft 20 occupied by the entire sequence of adjacent finger holders 110 is determined by the width 112W their respective axial finger bearings 112. It is clear that, in order to allow for such an arrangement the radial auger finger seat 114 of each finger holder 110 with a larger width 114W than the width 112W of the axial finger bearing 112, is arranged in such a way that it overlaps with its adjacent finger holders 110. As the length of the excenter shaft 20 occupied by the sequence of adjacent finger holders 110 is determined by the width 112W of their sequentially arranged axial finger bearings 112 and not by the larger width 114W of their radial finger seat 114, this means that the number of sequentially arranged finger holders 110 along the excenter shaft 20 can be maximized without reducing the robustness of radial finger seat 114. In this way for a predetermined length of the excenter shaft 20, the number of auger fingers 120 can be maximized, while still the width 120W of the auger finger 120 and the width 114W of the corresponding auger finger seat 114 can remain sufficiently large in order to allow for a sufficiently robust auger finger assembly 100. As will be explained in further detail with reference to FIGS. 4 to 6, the overlap of the radial finger seat 114 of a finger holder 110 with an adjacent finger holder 110 along the direction of the rotation axis R is possible as the radial finger seats 114 of adjacent finger holders 110 are positioned at different angular positions with respect to the central longitudinal axis E of the excenter shaft 20 during the rotational movement of the finger holders 110 and their auger fingers 120 around this excenter shaft 20 caused by the rotational movement of the rotatably driven auger body 10. As shown in FIG. 3, for example the longitudinal axis of the auger finger 120.2 and the radial finger seat 114 of its finger holder 110.2 point along a slightly upwards and backwards radial direction with respect to the excenter shaft 20 according to this front view, meaning along the direction indicated with arrow III in the side view of FIG. 4. The radial auger seat 114 of the adjacent finger holder 110.1 at the left side and its auger finger 120.1 points an almost straight downwardly. The radial auger seat 114 of the other adjacent finger holder 110.3 at its opposing right side and its auger finger 120.3 points in a slightly upwardly and forwardly radial direction with respect to the excenter shaft 20. It is clear that in this way, although the radial auger seat 114 of the auger finger holder 120.2, according to this embodiment overlaps with both its adjacent auger finger holders 120.1 and 120.3 along the direction of the rotation axis R, there is no risk for interference with the radial auger seats 114 of these adjacent auger finger holders 120.1 and 120.3, as they are positioned at a different radial position with respect to the excenter shaft 20.

Figure 8:
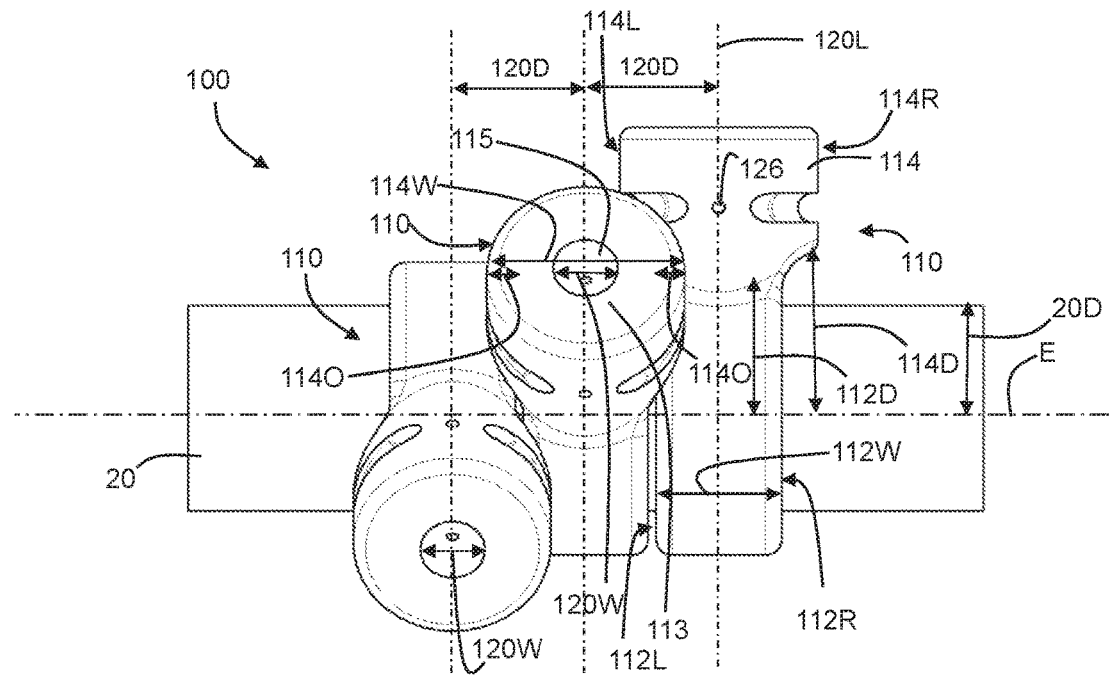
FIGS. 8 and 9 schematically show respective front and perspective views of three adjacent finger holders similar as in use in the embodiment of FIGS. 1 to 3, in accordance with an exemplary embodiment of the present invention.

As shown in FIG. 3, and further shown in more detail in FIG. 8, according to this embodiment of the auger finger holder 110, along the direction of the rotation axis R or the longitudinal axis E of the excenter shaft 20, the radial finger seat 114 overlaps at both sides where adjacent finger holders 110 are provided over a portion of its width 114W that is indicated as overlap distance 114O. According to this embodiment, as shown the overlap distance 114O is approaching half of the difference between the larger width 114W of the radial finger seat 114 and the width 122W of the axial finger bearing 112. It is clear that this overlap distance 114O ensures that, along the direction of the rotation axis R or the direction of the longitudinal axis E of the excenter shaft 20, for each of the finger holders 110, the distance 120D between the central longitudinal axes 120L of its finger 120 and the finger 120 of its adjacent finger holders 110, is smaller than the width 114W of its finger seat 114. It is clear that the distance 120D along the rotation axis R between adjacent fingers 120 is the same as the distance between the central longitudinal axes 120L of adjacent auger fingers 120 along the direction of the longitudinal axis E of the excenter shaft 20. It is further clear that, as the central longitudinal axes 120L of these auger fingers 120 project radially from the excenter shaft 20, this corresponds to the minimum distance between the central longitudinal axes 120L of adjacent fingers 120 which is reached at the level of the longitudinal axis E of the excenter shaft 20. According to the embodiment shown this distance 120L will be approaching the width 112W of axial auger bearing 112, as it is largely determined by two times half of the width 112W, meaning half of the width 112W of each of both axial auger bearings 112W of two adjacent finger holders 110. According to the embodiment shown the width 112W of the axial auger bearing 112 of the finger holder 120 is for example 70% of the width 114W of its radial finger seat 114, and as shown, the distance 120D along the direction of the longitudinal axis E of the excenter shaft 20 between the auger fingers 120 of adjacent finger holders 110 is also for example 70% of the width 114W of their radial finger seats 114. According to this embodiment, such as most clearly shown in FIG. 8, this means that the overlap distance 114O along the direction of the longitudinal axis E of the excenter shaft 20 is for example 15% of the width 114W of the radial finger seat 114 at its left side and approximately the same at its opposing right side, for example 15% of the width 114W of the radial finger seat 114. According to the embodiment, both overlap distances 114O of the radial finger seat 114 are equal and total up to 30% of the width 114W of the radial finger seat 114. It is clear that this is the complement of the width 112W of the axial finger bearing which is 70% of the width 114W of the radial finger seat 114 along the direction of the rotation axis R. It is clear that in this way the maximum number of adjacent finger holders 110 that can be arranged side by side on the excenter shaft 20, which is determined by the width 112W of the axial finger bearing 112 can be increased. When for example the width 112W of the axial finger bearing 112 is 70% of the width 114W of the radial finger seat 114, which thus means a reduction of 30% of the width along the direction of the rotation axis R. It is clear that this will result in an increase of the maximum number of adjacent finger holders 110 on an excenter shaft 20 with a predetermined length, when compared to prior art individual finger holders in which there was no overlap of adjacent finger holders 110. In the embodiment described above in which thirty-two adjacent finger holders 110 are provided on the excenter shaft 20 with a length of about 1 m in a central zone C, and where the width 112W of the axial finger bearing 112 is 70% of the width 114W of the radial finger seat 114, this means that for prior art finger holders with the same width for the radial finger seat only a maximum of twenty-two adjacent finger holders would have been possible without the overlap described above being present.

It is further clear that according to alternative embodiments, along the direction of the longitudinal axis E of the excenter shaft 20, other ratios then the 70% described above are possible for the ratio of the width 112W of the axial finger bearing 112 with respect to the width 114W of the radial finger seat 114, which according to this embodiment also determines the ratio between the central longitudinal axes 120L of adjacent fingers 120 and the width 114W of the radial finger seat 114. A suitable ratio in general results in the fact that along the direction of the rotation axis R, for each of the finger holders 110, the distance 120D between the central longitudinal axes 120L of its finger 120 and the finger 120 of at least one of its adjacent finger holders 110, is smaller than the width 114W of its finger seat 114. Preferably such a suitable ratio allows for a sufficient level of overlap so that a sufficient increase of the number finger holders can be achieved with respect to prior art finger holders, which will often result in a ratio of less than 90% for the ratio of the width 112W of the axial finger bearing 112 with respect to the width 114W of the radial finger seat 114. According to the embodiment described above, the latter thus resulting, for each finger holder 110, in overlap distances 114O totaling at least 10% of the width 114W of their radial finger seat 114. It is clear that in general any suitable ratio that, for each of the finger holders 110 of the auger finger assembly 110, when the auger fingers 120 are mounted, leads to the distance 120D between the central longitudinal axes 120L of its finger 120 and the finger (120) of at least one of its adjacent finger holders 110 is less than 90%. Preferably, a suitable ratio of the width 112W of the axial finger bearing 112 with respect to the width 114W of the radial finger seat 114 of the finger holder 110, also insures that the axial finger bearing 112 remains sufficiently wide along the direction of the longitudinal axis E of the excenter shaft 20 in order to reliably cope with the forces transferred from the auger finger 120 via the radial finger seat 114 and the axial finger bearing 112 to the excenter shaft 20, and is for example in the range of 20% to 80%. It is clear that such a ratio according to the embodiment of the auger finger assembly 100 described above will in general result in the distance 120D, between the central longitudinal axes 120L of the fingers 120 of adjacent finger holders 110, being in the range of 20% to 80% of the width 114W of the finger seat 114 of the finger holders 110.

It is further clear, from what was described above with reference to the embodiment of the auger finger assembly 100 as shown in FIGS. 1 to 9, that the finger holder 110 has a mirror symmetrical shape with respect to the plane orthogonal to the central longitudinal axis E of the excenter shaft 20 and along the longitudinal axis 120L of its auger finger 120 when mounted, such as clearly shown in the views of FIGS. 3 and 8. Additionally, as all finger holders 110 have an identical shape, which simplifies manufacturing and assembly of the auger finger assembly 100, it is clear that the distance 120L from the central longitudinal axis of a particular auger finger 120 to the longitudinal axes of its adjacent auger fingers 120 will be identical. For example the distance 120D from the central longitudinal axis 120L of auger finger 120.4 of the finger holder 110.4 to the central longitudinal axis 120L of its adjacent auger finger 120.5 of its adjacent finger holder 110.5 at its right side according to the view shown in FIGS. 2 and 3, is identical to the distance 120L to the central longitudinal axis 120L of its other adjacent auger finger 120.3 of the other adjacent finger holder 110.3 at its opposite left side according to the view shown in FIGS. 2 and 3. This thus means that, along the direction of the longitudinal axis E of the excenter shaft 20, the mean distance 120MD between these longitudinal axes 120L of these adjacent auger fingers 120.3, 120.4 and 120.5 will be equal to the distance 120D, as shown in FIG. 3. Additionally it is clear that this also holds for the other finger holders 110 of the auger finger assembly 100 which, along the direction of the rotation axis R, are provided at opposing sides with adjacent finger holders 110. From what is described above, with reference to the distance 120D between the longitudinal axes 120L of adjacent auger fingers 120 of adjacent finger holders 110, it is clear that for the embodiment of the auger finger assembly 100 the overlapping finger holders 110 shown in FIGS. 1 to 9 are arranged such that also the mean distance 120MD between the central longitudinal axes 120L of the adjacent fingers 120 of adjacent finger holders 110, is smaller than the width 114W of the finger seat 114, thereby allowing for an increase in the number of finger holders 110 arranged adjacently on the excenter shaft 20 combined with a high level of robustness of the finger holder 110 as there is no corresponding reduction of the width 114W of the finger seat 114. Preferably, as explained above this mean distance 120MD is less than 90%, for example in the range of 20% to 80%, of the width 114W of the finger seat 114, in order to allow for a sufficient increase of the number of finger holders 110, but still retaining a sufficiently large width 112W along the direction of the longitudinal axis E of the excenter shaft 20 for the axial finger bearing 112. According to the exemplary embodiment described above with reference to FIG. 3, there is provided a mean distance 120MD of for example 70% of the width 114W of the finger seat 114 of adjacent finger holders 110.

It is further clear that according to the embodiment shown in FIGS. 1-9, along the direction of the rotation axis R, the radial finger seat 114 of each of the finger holders 110 that comprises two adjacent finger holders 110, at least partly overlaps with the finger bearing 112 of both of its adjacent finger holders 110. It is clear that, for example, the radial finger seat 114.2 of finger holder 110.2 overlaps along the direction of the rotation axis R and thus also along the direction of the longitudinal axis E of the excenter shaft 20, with the finger bearing 112.1 of the finger holder 110.1 at its left side in the view of FIG. 3, and also overlaps, along the direction of the rotation axis R, with the finger bearing 112.3 of the finger holder 110.3 at the opposing right side in the view of FIG. 3. Additionally, for example, the radial finger seat 114.3 of the finger holder 110.3 overlaps at both opposing sides along the direction of the longitudinal axis E of the excenter shaft, with respectively the finger bearing 112.2 of the finger holder 110.2 and the finger bearing 112.4 of the finger holder 110.4. Similarly the radial finger seat 114.4 overlaps at both opposing sides along the direction of the longitudinal axis E of the excenter shaft 20 with the axial finger bearing 112.3 and 112.5. It is clear that similarly all other radial finger seats 114 of finger holders 110 that comprise two adjacent finger holders 110 at both opposing sides along the direction of the longitudinal excenter shaft 20, overlap with the axial finger bearings 112 of these two adjacent finger holders 110 similar as described above.

Alternative embodiments of the finger holder 110, similar to that shown in FIGS. 1-9, are possible, which are not mirror symmetrical with respect to the plane orthogonal to the central longitudinal axis E of the excenter shaft 20 and along the longitudinal axis 120L of its auger finger 120 when mounted, such that this no longer results in an equal share of the overall overlap distances 114O at both opposing sides of the finger holder 110 with respect to the direction of the rotation axis R, but in a differing share of the overall overlap distance 114O at both opposing sides of the finger holder 110. The share of the overlap distance 114O at one side could for example be in the range of 10% to 90% of the overlap distance at the opposing side of the finger holder 110 with respect to the longitudinal axis E of the excenter shaft 20. However, similar as for the embodiment described above with reference to FIGS. 1 to 9, also for these finger holders 110, along the direction of the rotation axis R, the width 112W of the axial finger bearing 112 is smaller than the width 114W of the radial finger seat 114.

As shown, according to the embodiment of FIGS. 1-9, the axial finger bearing 112 of the respective finger holders 110 extends along the direction of the rotation axis R, or equally the direction of the central longitudinal axis E of the excenter shaft 20, between a two outer ends 112L, 112R. As shown for example in FIG. 3 a first outer end 112L is situated at the leftmost side of the axial finger bearing 112, while an opposing second outer end 112R is situated at the rightmost side of the axial finger bearing 112 according to this view. As further shown, it is clear that the width 112W of the axial finger bearings 112 is the distance between their respective outer ends 112L, 112R. As further shown, also the radial finger seat 114 of the respective finger holders 110 extends along the direction of the rotation axis R, between two outer ends 114L, 114R. As shown in FIG. 3, according to this view in which the rotation axis R extends from left to right, a first outer end 114L is located at the leftmost end of the radial finger seat 114, while an opposing second outer end 114R is located at the rightmost end of the radial finger seat 114. The width 114W of the radial finger seat 114 along the direction of the rotation axis R, or the direction of the longitudinal axis E of the excenter shaft, as shown, thus being the distance between these outer ends 114L, 114R. It is further clear, that, along the direction of the rotation axis R, for example, the outer end 112R of the axial finger bearing 112.4 of the finger holder 112.4 is positioned in between the outer ends 114L, 114R of the radial finger seat 114.5 of the overlapping adjacent finger holder 110.5. Also, the other outer end 112L of the axial finger bearing 112.4 of this finger holder 110.4, will similarly be positioned in between the outer ends 114L, 114R of the radial finger seat 114.3 of the other overlapping adjacent finger holder 110.3. As shown, according to this embodiment, for each of the finger holders 110 that has two respective, overlapping adjacent finger holders 110, both of the outer ends 112L, 112R of the axial finger bearing 112 of this finger holder 110 are respectively is positioned in between the outer ends 114L, 114R of the finger seat 114 of the respective, overlapping adjacent finger holder 110 along the direction of the longitudinal axis E of the excenter shaft 20 or the rotation axis R.

FIG. 8 shows an embodiment auger finger assembly 100 comprising the excenter shaft 20 and three adjacent finger holders 110, sequentially arranged on the exenter shaft 20 along the direction of the longitudinal axis E of the excenter shaft 20. It is clear that in FIG. 8 only three adjacent finger holders 110 are shown in order to more clearly show the sequential arrangement of the individual, adjacent finger holders 110, and that any suitable multiple of adjacent finger holders 110 could be arranged along the excenter shaft 20. As described with reference to FIGS. 1 to 3, the auger assembly 100 could further also comprise the tubular auger body 10 comprising the corresponding multiple of openings 30 for the multiple of auger fingers 120 of the multiple of finger holders 110. The multiple adjacent finger holders 110 are then arranged individually on the excenter shaft 20 such that the corresponding multiple of auger fingers 120 can be mounted as explained in detail above. In this way each of the auger fingers 120 extends from its inwards end 122, that is held at the radial finger seat 114 of its associated finger holder 110, along its longitudinal axis 120L through its associated opening 30 in the tubular auger body 10, to its outward end 124. FIG. 9 shows four of the finger holders 110 for use in the embodiment of the auger finger assembly 100 of FIG. 8. Although there are shown four any other suitable multiple of finger holders 110 is possible. It is clear that, when such finger holders 110 are mounted adjacent to each other on the excenter shaft 20, as shown in FIG. 8, along the direction of the rotation axis R or the direction of the longitudinal axis E of the excenter shaft, such that the radial finger seat 114 of the finger holders 110 at least partly overlaps with the finger bearing 112 of at least one of its adjacent finger holders 110 as explained above a larger number of individual finger holders can be arranged along a predetermined length of the excenter shaft 20, without compromising the flexibility for arranging the individual auger fingers and the robustness of the finger holder.

Figure 9:
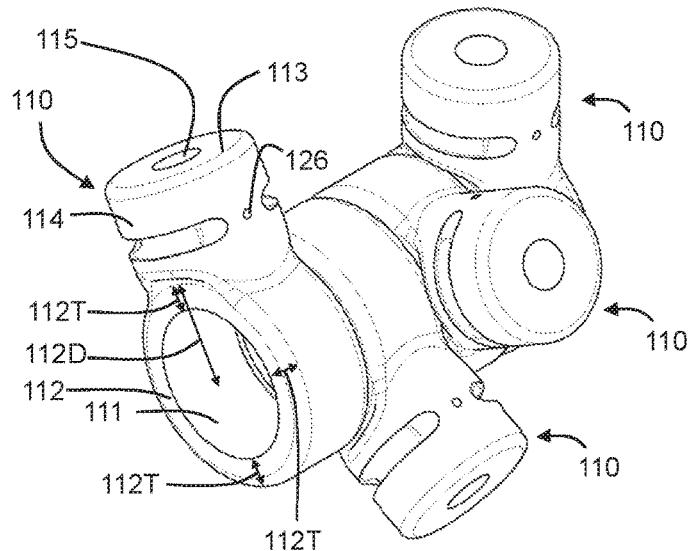

It is further also clearly shown in FIGS. 8 and 9, that the axial finger bearing 112 of the finger holders 110 retains its width 112W up to a first radial distance 112D with respect to the longitudinal axis E of the excenter shaft. As already mentioned above, according to the embodiment shown, the tubular or annular axial finger bearing 112 comprises a central opening 111 with a radius that approximates the radius 20D of the excenter shaft 20 and a radial annular wall thickness 112T, so that the first radial distance 112D approximates the radius 20D of the excenter shaft 20 increased with the radial annular wall thickness 112T. The first radial distance 112D to the longitudinal axis E of the excenter shaft 20, is thus larger than the radius of the excenter shaft 20D. As shown, in a first radial zone, in between the excenter shaft 20 and this first radial distance 112D, the width 112W of the axial finger bearing 112 of the auger finger 110 remains smaller than the width 114W of the radial finger seat 114 along the direction of the longitudinal axis E of the excenter shaft 20 as explained in more detail above. As shown it is only at a second radial zone, which extends outwardly from a second radial distance 114D with respect to the longitudinal axis E of the excenter shaft 20. This second radial distance 114D, which, as shown, is larger than the first radial distance 112D, forms a lower limit for the second radial zone in which the radial finger seat 114 is allowed to stretch out along the direction of the longitudinal axis E of the excenter shaft 20 beyond the width 112W of the axial finger bearing 112 to the width 114W of the radial finger seat 114 which is preferably reached at the location where the auger finger 120 is mounted in order to allow for a robust mounting of the auger finger 120 to the finger holder 110. As shown in the embodiment in between the first radial zone and the second radial zone preferably the width is increased in a suitable and gradual way from the width 112W of the axial finger bearing 112 to the width 114W of the radial finger seat 114 as in this way the risk of stress concentrations is reduced. However, it is clear that alternative embodiments are possible, and for example also embodiments in which the increase from the width 112W to the width 114W is performed in a stepwise fashion.

It is further clear, from for example FIGS. 8 and 9, when finger holders 110 according to this embodiment are arranged adjacent to each other on the excenter shaft 20, by inserting the excenter shaft 20 into their central cylindrical opening 111 of their axial finger bearing 112, each of the finger holders 110 is positioned in an angular position with respect to the central longitudinal axis E of the excenter shaft, such that its radial finger seat 114 does not interfere with the angular position of the adjacent radial finger seats 114 of the adjacent finger holders 110 with which its radial finger seat 114 overlaps along the direction of the central longitudinal axis E of the excenter shaft 20. It is clear that, also during the operation of the finger assembly 100, in which, with respect to the central longitudinal axis E of the excenter shaft 20, the angular positions of adjacent finger holders 110 relative to each other vary to a predetermined degree, during a revolution of the auger body 10 around its rotation axis R and the corresponding revolution of the auger finger holders 110 around the excenter shaft 20, interference of the radial finger seats 114 of overlapping finger holders 110 is to be avoided. According to the embodiment of the auger assembly 100 shown in FIGS. 1 to 7, during the operation of the auger assembly 100 there must be provided a minimal relative difference in the respective angular positions of the radial finger seats 114 of adjacent overlapping auger fingers 110 relative to each other in the range of 50° to 80°, for example 60° or 75°.

Figure 4:
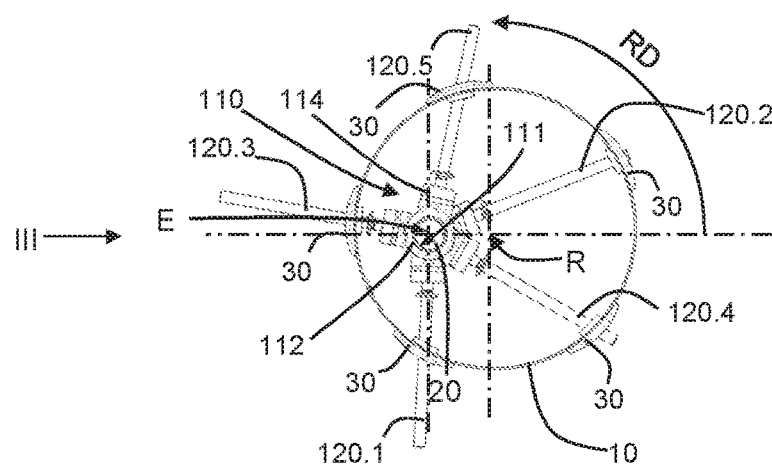
FIGS. 4 to 6 schematically show a side view of the auger finger assembly of FIGS. 1 and 2 in different radial positions during rotational movement of the auger body, to illustrate a radial distribution of the subgroup of five auger fingers shown in FIG. 3, in accordance with an exemplary embodiment of the present invention.
Figure 5:
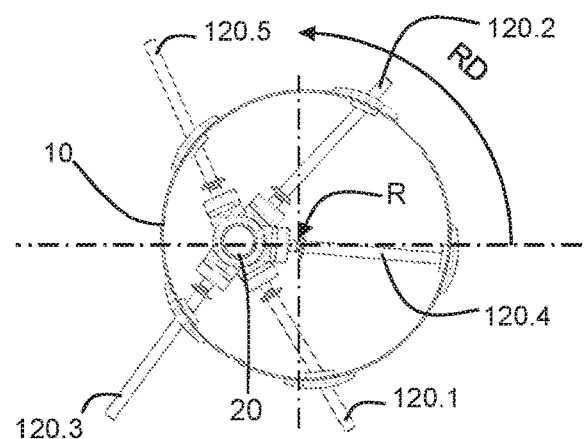
Figure 6:
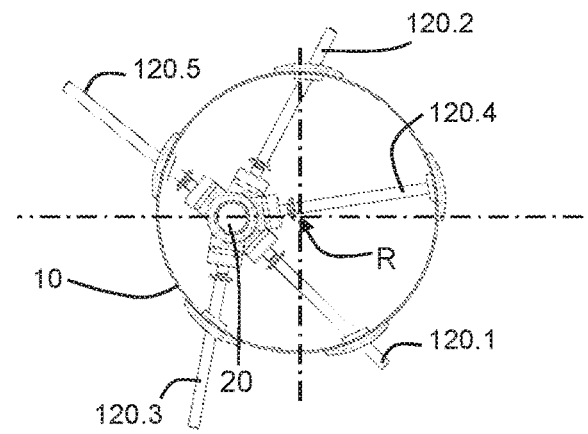

FIGS. 4 to 5 show the angular positions, with respect to the central axis E of the excenter shaft 20, of the five adjacent finger holders 110.1-110.5 of the subgroup 200 shown in FIG. 3 of the embodiment of the auger finger assembly 100 as shown in FIGS. 1 and 2, during an operation of the auger finger assembly 100 in which the auger body 10 is rotated along the rotation direction RD around its rotation axis R. FIGS. 4 to 5 shown the auger body 10 in different angular positions with respect to the rotation axis R during its rotational movement around this rotation axis R. As shown, the corresponding finger openings 30 of the five auger fingers 120.1-120.5 mounted to the excenter shaft 20 by the five finger holders 110.1-110.5 of the subgroup 200 are distributed around the circumference of the auger body 10. This means that the angular positions of these five finger openings 30 with respect to the rotation axis R of the auger body 10 approximate an even angular distribution. As shown in the view of FIGS. 4 to 6, the five finger openings 30 of this subgroup are distributed around the circumference of the auger body 10 such that, with respect to the rotation axis R, the angle between angularly adjacent finger openings 30 approximate one fifth of 360°, for example with a maximum deviation of 20%. It is clear that such a distribution is preferable as in this way the auger fingers 120.1-120.5 can distribute their crop engaging function as uniformly as possible with respect to the circumference of the auger body 10. It is further clear that the angular distribution of the finger openings 30 on the circumference of the auger body 10 around the rotation axis R determines the angular distribution of the corresponding auger fingers 120.1-120.5 and their finger holders 110 around the central axis E of the excenter shaft 20. As shown in FIGS. 4 to 6, although, during operation of the auger finger assembly 100 the angle between the adjacent angular positions of the finger openings 30 remains constant with respect to the rotation axis R, the angle between the angular positions of the corresponding angularly adjacent auger fingers 120.1-120.5 and their finger holders 110.1-110.5 with respect to the rotation axis E of the excenter shaft 20 varies during the rotation of the auger body 10. According to this embodiment, in which finger holders 110 overlap with both axially adjacent finger holders 110, this means that adjacent along the direction of the central axis E of the excenter shaft 20, in order to provide for a sufficient difference in angular positions of these axially adjacent finger holders 110 such that a suitable arrangement without interference of their overlapping radial finger seats 114 is obtained during the operation of the auger finger assembly 100, are provided with finger openings 30 that are not in an angularly adjacent position. For example, this means that, as viewed in FIGS. 4 to 6, with reference to the angular position of the finger opening 30 of the corresponding auger finger 120.3 and corresponding finger holder 110.3, the angular positions of both finger openings 30 of both its axially adjacent auger fingers 120.2 and 120.4 and their corresponding fingers holders 110.2 and 110.4, with which the finger holder 110.3 overlaps, are not angularly adjacent with respect to the rotation axis R. This means that both finger openings 30, which are in an angular adjacent position to the finger openings 30 with respect to the rotation axis R, are axially positioned on the auger body 10 for cooperation with corresponding auger fingers 120 of which the finger holders 110 don't overlap. According to this embodiment this for example means that the angularly adjacent openings 30 of that of auger finger 120.3 and finger holder 110.3, are axially positioned on the auger body 10 to respectively cooperate with the auger fingers 120.1 and 120.5, and their finger holders 110.1 and 110.5. It is clear that the finger holder 110.3 does not overlap with these finger holders 110.1 and 110.5. It is further clear that the finger holder 110.3 is also not axially adjacent to these finger holders 110.1 and 110.5. It is further clear that the same reasoning could be applied for the arrangement of the auger fingers 120.1 to 120.5, the axial sequential arrangement of their corresponding finger holders 110.1-110.5 and the angular arrangement of their corresponding finger openings 30. Such an arrangement is preferable as in this way a sufficiently large angle between the angular positions of overlapping finger holders 110 is obtained during the operation of the auger finger assembly 100 in which the auger body 10 rotates around the rotation axis R. Additionally, it is clear that according to this embodiment the auger finger assembly 100 comprises a plurality of sequentially arranged subgroups 200 comprising a set of five adjacent finger holders 110, auger fingers 120 and corresponding finger openings 30 similarly arranged as described above. According to alternative embodiments, these subgroups 200 could comprise any other suitable number of adjacent finger holders 110, such as for example four, six, seven, eight, nine or more. A sufficiently high uneven number is however preferable, such as for example five, seven, nine, etc. as in this way a sufficiently uniform distribution of the impact of the auger fingers on the crop material along the circumference of the auger body can be achieved and the uneven number of auger fingers in such a subgroup 200 facilitates the arrangement of the finger openings 30 for corresponding finger holders that overlap with both axially adjacent finger holders, as then there can be composed a simple sequential arrangement of the axial finger holders along the excenter shaft 20 by providing an axial sequence in which the with respect to the angular position for a corresponding auger finger, the next auger finger in the sequence and its corresponding finger opening is provided with an angular position which is not angularly adjacent. According to the embodiment shown in FIGS. 4 to 6, this means that in the axial sequence of the subgroup 200, that comprises an axial sequence of adjacent auger fingers 120.1, 120.2, 120.3, 120.4 and 120.5, corresponds to an angular sequence around the circumference of the auger body 10 along the direction of rotation RD of angularly adjacent auger fingers 120.3, 120.1, 120.4, 120.2, 120.5. This angular sequence could be viewed as a sequence in which in between each axially adjacent auger finger and corresponding finger holder there is interposed an auger finger and corresponding finger holder which is not axially adjacent to both, for example in between the axially adjacent auger fingers 120.3 and 120.4, there is interposed in the angular sequence the auger finger 120.1, which is not axially adjacent to both these auger fingers 120.3 and 120.4; in between auger finger 120.1 and 120.2 similarly 120.4 is interposed in the angular sequence, etc.

Figure 7:
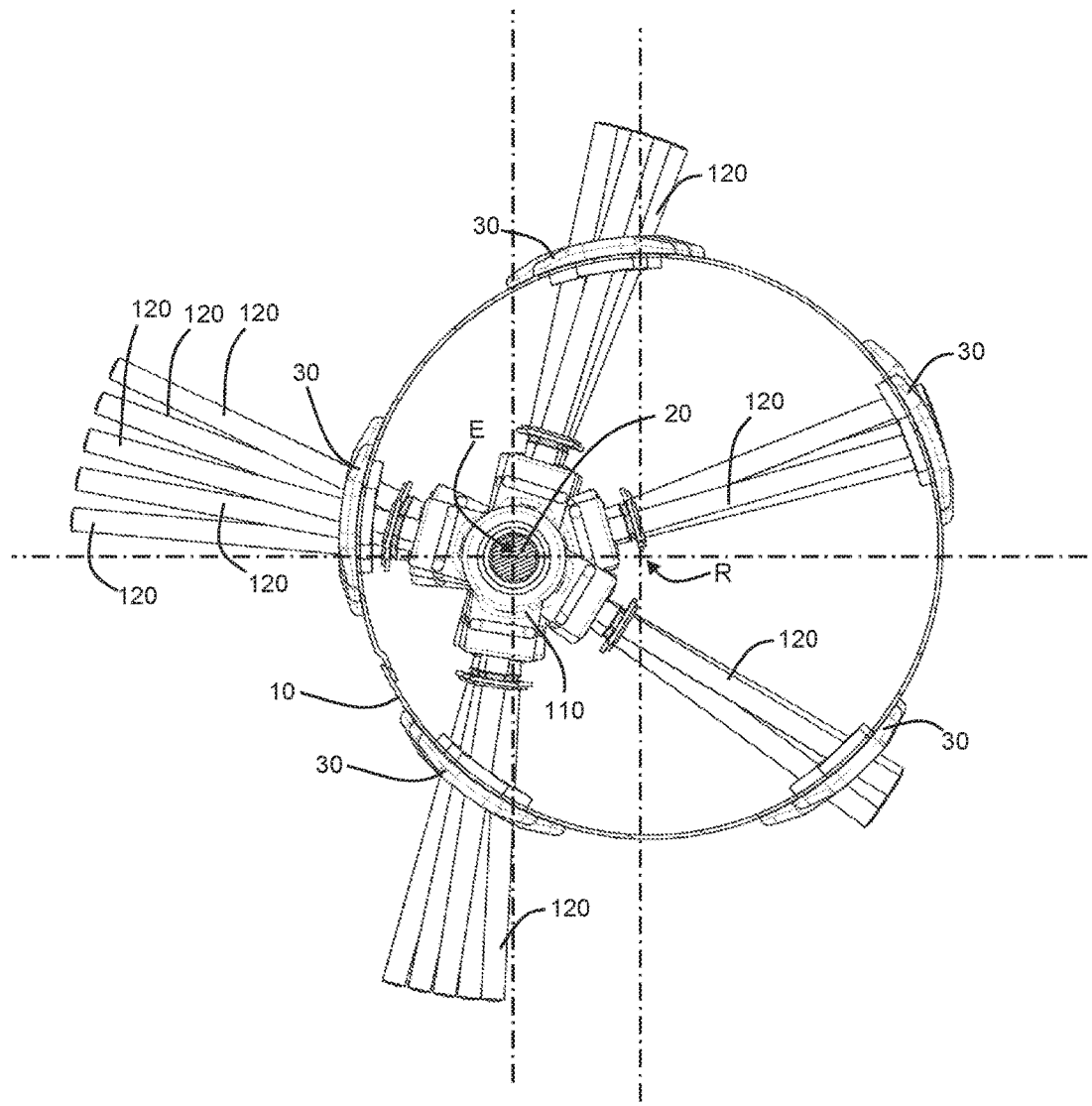
FIG. 7 schematically shows a further side view of the auger finger assembly of FIGS. 1 and 2, illustrating a radial distribution of the auger fingers of all subgroups of the auger finger assembly, in accordance with an exemplary embodiment of the present invention.

In addition, as clearly shown in FIG. 7, the distribution along the circumference of the auger body 10, according to the embodiment of the auger finger assembly of FIGS. 1-9, which comprises a plurality of adjacent subgroups 200 is still further optimized. As shown in FIGS. 1 to 6, each subgroup 200 of the auger assembly comprises a subset of five adjacent finger holders 110 of which the associated auger fingers 120 and openings 30 are distributed angularly along a single revolution of the circumference of the auger body 10 similarly as described above. As further shown in FIGS. 1 to 3 and most clearly in the side view along the direction of the rotation axis in FIG. 7, the angular positions of the respective auger fingers 120 and openings 30 of different subgroups 200 differ from each other. As shown the angular positions of the corresponding auger fingers of different subgroups 200 differ from each other in some kind of a wavy pattern within a range of for example 10°-15°, which optimizes the uniformity of the crop flow. However it is clear that alternative embodiments are possible, for example in which more random variations in the angular position between the respective auger fingers of different subgroups 200 are present. Such an increase in the variation of the angular position of the auger fingers 120 of the auger finger assembly 100 is further also advantageous, as it improves the distribution of the loads imparted by the respective auger fingers 120 via their corresponding finger holders 110 on the excenter shaft 20 during operation of the auger finger assembly 100. It is clear that, for an embodiment of an auger finger assembly 100 in which all auger fingers 120 are positioned in an angularly aligned way, this means at a plurality of aligned angular positions, this will result in a corresponding plurality of peak loads on the excenter shaft 20 for each revolution of the auger body 10, as the loads exerted by the crop on each set of angularly aligned auger fingers will be imparted in a synchronized way. It is clear that, by the additional variation of the angular position of the auger fingers 120 as described above, the loads will be exerted by the crop on the different auger fingers in a less synchronized way, leading to lower and wider peaks of the loads exerted by the auger fingers via their auger finger holders on the excenter shaft during one revolution of the auger body. Additionally, it is also clear that the individual mounting of the auger fingers 120 by their finger holders 110 on the excenter shaft 20, still further optimizes distribution of these loads, as the loads of these individually mounted auger fingers 120 are then also more optimally spread along the direction of the longitudinal central axis E of the excenter shaft 20.

It is further clear that, as already mentioned above, as shown in FIGS. 1 and 2, and also more clearly in FIG. 3 which shows a subgroup 200 of this embodiment of the auger finger assembly 100, each finger holder 110 individually mounts its respective auger finger 120.1-120.5 to the excenter shaft 20. A single finger holder 110 thus mounts a single auger finger 120 to the excenter shaft 20. As further shown, according to this embodiment of the finger holder 110, it comprises a radial finger seat 114 that holds the associated auger finger 120 at its inwards end 122. This radial finger seat 114 projects radially from an axial finger bearing 112 of the finger holder 110, meaning transverse to the excenter shaft 20 and along a radial direction with respect to the central longitudinal axis E of the excenter shaft 20. The axial finger bearing 112 of the finger holder 110 rotatably mounts its radial finger seat 114 to the excenter shaft 20, such that the associated auger finger 120 can be rotated by means of the associated finger opening 20 in the auger body 10 around the excenter shaft 20 during operation of the auger finger assembly 100.

Figure 10:
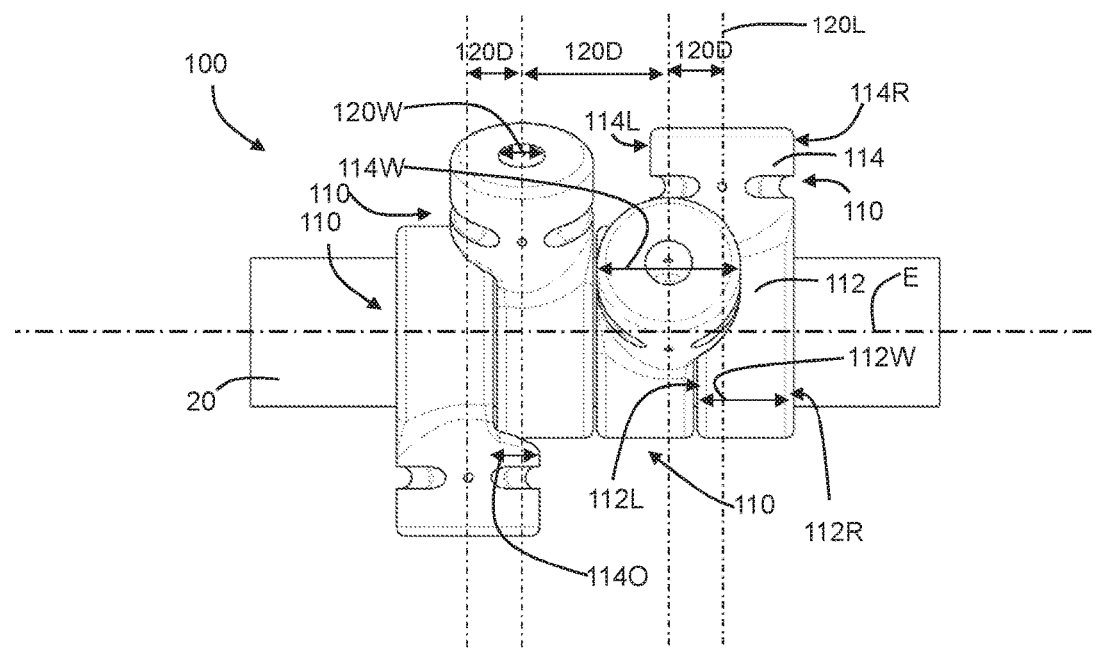
FIGS. 10 and 11 schematically show respective front and perspective views of an exemplary alternative embodiment of three adjacent finger holders, in accordance with an exemplary embodiment of the present invention.
Figure 11:
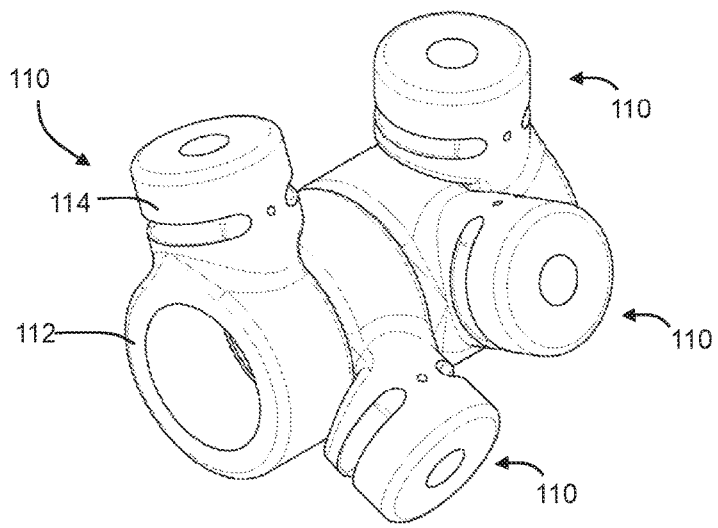
Figure 12:
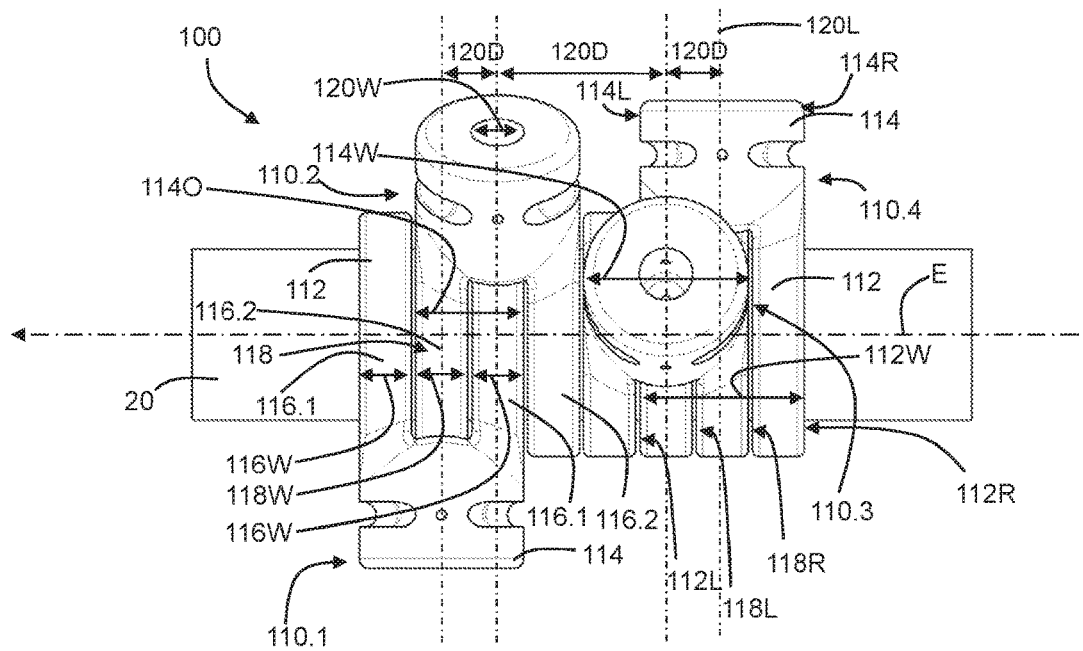
FIGS. 12 and 13 schematically show respective front and perspective views of another exemplary alternative embodiment of three adjacent finger holders, in accordance with an exemplary embodiment of the present invention.
Figure 13:
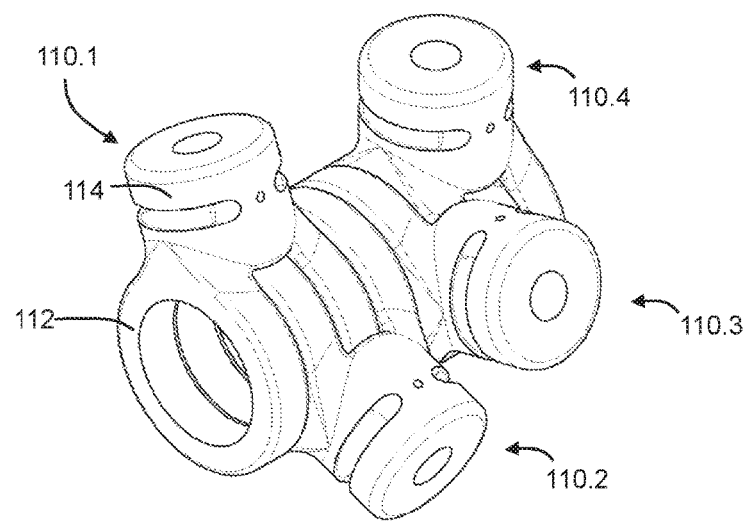

It is clear that still further alternative embodiments are possible to the embodiment described above in which a finger holder 110 generally overlaps with both its adjacent finger holders 110. Alternative embodiments are possible, in which in general, along the direction of the rotation axis R, the radial finger seat 114 of each of the finger holders 110 that comprises two adjacent finger holders 110, at least partly overlaps with the finger bearing 112 of one of its adjacent finger holders 110. One such alternative embodiment is shown in FIGS. 10 and 11. A further one is shown in FIGS. 12 and 13. The embodiment shown in FIGS. 10 and 11 is similar to the embodiment of FIGS. 1 to 9, and similar elements have been provided with the same reference sign and generally function as explained above. However, the longitudinal axis 120L of the auger finger 120, which still forms an axis of symmetry for the radial finger seat 114 but no longer for the axial finger bearing 112 which now comprises an axis of symmetry, which is shifted along the longitudinal axis E of the excenter shaft 20 with respect to the axis of symmetry of the radial finger seat 114. In this way, as shown along the direction of the rotation axis R, only one of the outer ends 112L or 112R of the axial finger bearing 112 is positioned in between the outer ends 114L, 114R of the finger seat 114 of a respective, overlapping adjacent finger holder 110. According to this embodiment, the other outer end of the axial finger bearing is in line with the respective outer end of the finger seat of its finger holder. This embodiment offers next the advantage that the reduced width of the axial finger bearing 112 allows for an increase in the number of finger holders 10 that can be arranged along a given length of the excenter shaft 20 as the distance 120D between the longitudinal axes of the auger fingers of overlapping adjacent finger holders 110 is reduced, which thus also reduces the related mean distance 120D for the auger finger assembly, additionally the advantage that there is only pairwise overlap of the finger holders 110. This means that a large degree of freedom is available for choosing the angular position for the finger holders that do not overlap, as there is no risk of interference of their respective radial auger seats 114. As shown the overlap distance 114O according to this embodiment is for example about 30% of the width 114W of the radial finger seat 114. It is clear that another ratio for the overlap distance could be chosen but preferably it stays below 50% of the width 114W of the radial finger seat 114 as the longitudinal axis 120L of the auger finger 120 is offset with respect to the axis of symmetry of the axial finger bearing 112 of its corresponding finger holder 110 and in this way during operation induced moments resulting from the load on the auger finger and resulting from the offset position of the radial finger seat 114 with respect to the axial finger bearing 112 are kept within acceptable limits.

The further alternative embodiment of FIGS. 12 and 13 shows an embodiment of the auger finger assembly with finger holders 110 of which the radial finger seat is generally similar to that described with reference to the embodiments mentioned above and similar elements are referenced with similar elements and generally function in a similar way. The main difference with the embodiments mentioned above is that the axial finger bearing 112 along the direction of the rotation axis R comprises two axial bearing sections 116.1 and 116.2 with an axial opening 118 in between. As shown, along the direction of the rotation axis R, the axial finger bearing 112 sequentially comprises: a first axial bearing section 116.1 extending from its first outer end 112L to a first intermediate end 118L; subsequently an axial opening 118 extending between the first intermediate end 118L to a second intermediate end 118R; and finally a second axial bearing section 116.2 extending from the second intermediate end 118R to its second outer end 112R. As shown, the width 118W of the axial opening 118 is slightly larger than the width 116W of the first or second axial bearing section 116.1, 116.2. This allows axially adjacent finger holders to overlap in a pairwise fashion by positioning in the axial opening 118 respectively the first or second axial bearing section 116.1, 116.2 of a respective, overlapping adjacent finger holder 110. In this way, even when according to the embodiment as shown, the width of the axial finger bearing 112 of the finger holders 110 equals the width 114W of its radial finger seat 114, there is provided for an overlap distance 114O equal to the sum of the width of the axial opening 118W and the width 116W of one of the axial bearing sections 116.1 or 116.2. As shown the overlap distance 114O could be for example two thirds of the width of the radial finger seat 114W. It is clear that according to alternative embodiments the overlap distance 114O could have other such ratios such as for example in the range of 50% to 85%. However embodiments in which the respective width 116W of the axial bearing sections 116.1 and 116.2 is equal to or only slightly smaller than the width 118W of the axial opening 118, which thus means that these widths 116W, 118W are approximately one third of the width 114W of the radial finger seat 114, as in this way, as shown in FIGS. 10 and 11 a mirror symmetrical construction of the axial finger bearing 112 with respect to the longitudinal axis 120L of the auger finger 120 when mounted is realized, thereby providing for a robust construction in which the width 116W of the axial bearing sections is maximized.

It is clear that still further alternative embodiments or combinations of embodiments of the finger holders and of the auger finger assembly then those described above, as long as in general along the direction of the rotation axis R, which also means along the direction of the longitudinal axis E of the excenter shaft 20, the radial finger seat 114 of each of the finger holders 110 at least partly overlaps with the axial finger bearing 112 of at least one of its adjacent finger holders 110.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An auger finger assembly comprising:
   an excenter shaft configured to be mounted inside a rotatably driven tubular auger body, the excenter shaft comprising a central longitudinal axis parallel and excentric to a central rotation axis of the auger body;
   a plurality of auger fingers, each extending along a central longitudinal axis; and
   a plurality of finger holders mounted adjacent to each other on the excenter shaft along a direction of the rotation axis, each of the plurality of finger holders configured to individually mount a respective one of the plurality of auger fingers, each of the plurality of finger holders comprising:
      an axial finger bearing at least partly enclosing the excenter shaft; and
      a radial finger seat radially projecting from the axial finger bearing, the radial finger seat configured to hold the respective one of the plurality of auger fingers at an inward end,
   wherein along the direction of the rotation axis, the radial finger seat of each of the plurality of finger holders at least partly overlaps with the axial finger bearing of at least one adjacent one of the plurality of finger holders.

2. The auger finger assembly of claim 1, wherein, for each of the plurality of finger holders, a distance between the central longitudinal axis of the respective one of the plurality of auger fingers and the central longitudinal axis of the finger of an adjacent one of the plurality of finger holders is smaller than the width of the finger seat of the each of the plurality of finger holders.

3. The auger finger assembly of claim 2, wherein the distance is less than 90% of the width of the finger seat of the each of the plurality of finger holders.

4. The auger finger assembly of claim 1, wherein a mean distance between the central longitudinal axes of the fingers of adjacent ones of the plurality of finger holders along the direction of the rotation axis is smaller than a width of the finger seat of either of the adjacent ones of the plurality of finger holders.

5. The auger finger assembly of claim 4, wherein the mean distance is less than 90% of the width of the finger seat of either of the adjacent ones of the plurality of finger holders.

6. The auger finger assembly of claim 1, wherein along the direction of the rotation axis, the radial finger seat of each of two adjacent ones of the plurality of finger holders at least partly overlaps with the finger bearing of the other of the two adjacent ones of the plurality of finger holders.

7. The auger finger assembly of claim 1, wherein along the direction of the rotation axis, the radial finger seat of one of the plurality of finger holders at least partly overlaps with the axial finger bearing of each of two adjacent ones of the plurality of finger holders.

8. The auger finger assembly of claim 1, wherein each of the plurality of finger holders is configured such that, along the direction of the rotation axis, a width of the axial finger bearing of the each of the plurality of finger holders is smaller than a width of the radial finger seat of the each of the plurality of finger holders.

9. The auger finger assembly of claim 1, wherein the plurality of finger holders are configured such that along the direction of the rotation axis for each of the plurality of finger holders:

the axial finger bearing extends between first and second outer ends, a width of the axial finger bearing being a distance between the outer ends of the axial finger; and the radial finger seat extends between two outer ends, a width of the radial finger seat being the distance between the outer ends of the radial finger seat; and at least one of the outer ends of the axial finger bearing is positioned in between the outer ends of the finger seat of an adjacent, overlapping one of the plurality of finger holders.

10. The auger finger assembly of claim 9, wherein the plurality of finger holders are configured such that along the direction of the rotation axis for each of the plurality of finger holders:

the axial finger bearing sequentially comprises:
a first axial bearing section extending from its first outer end to a first intermediate end;
an axial opening extending between the first intermediate end to a second intermediate end; and
a second axial bearing section extending from the second intermediate end to its second outer end,
wherein a width of the axial opening of the axial finger bearing of the each of the plurality of finger holders is equal to or larger than a width of the first or second axial bearing section of the axial finger bearing of the each of the plurality of finger holders; and
wherein in the axial opening of the axial finger bearing of the each of the plurality of finger holders there is positioned the first or second axial bearing section of a respective, overlapping adjacent one of the plurality of finger holders.

11. The auger finger assembly of claim 1, wherein the auger finger assembly further comprises a tubular auger body comprising a plurality of openings for the plurality of auger fingers, wherein each of the plurality of fingers extends through a respective one of the plurality of openings of the tubular auger body.

12. The auger finger assembly of claim 11, wherein the plurality of openings of the tubular auger body are positioned such that openings for fingers of axially adjacent, overlapping ones of the plurality finger holders are not in an adjacent angular position with respect to the rotation axis.

13. The auger finger assembly of claim 11, wherein the auger finger assembly further comprises a plurality of subgroups, each subgroup comprising a subset of four, five, six, seven, or more adjacent ones of the plurality of finger holders of which the respective auger fingers and the respective ones of the plurality of openings:
are distributed angularly along a single revolution of a circumference of the auger body, and
have angular positions that differ from angular positions of the auger fingers and openings corresponding to other subgroups of the plurality of subgroups.

14. A plurality of finger holders for mounting adjacent to each other on a excenter shaft along a direction of a rotation axis, each of the plurality of finger holders configured to individually mount a respective one of a plurality of auger fingers, each of the plurality of finger holders comprising:
an axial finger bearing configured for at least partly enclosing the excenter shaft; and
a radial finger seat radially projecting from the axial finger bearing, the radial finger seat configured to hold a respective one of a plurality of auger fingers at an inward end,
wherein along the direction of the rotation axis, the radial finger seat of each of the plurality of finger holders at least partly overlaps with the axial finger bearing of at least one adjacent one of the plurality of finger holders.

15. The plurality of finger holders of claim 14, wherein, for each of the plurality of finger holders, a distance between a central longitudinal axis of the each of the plurality of finger holders and a central longitudinal axis of an adjacent one of the plurality of finger holders is smaller than a width of the finger seat of the each of the plurality of finger holders.

16. The plurality of finger holders of claim 15, wherein the distance is less than 90% of the width of the finger seat of the each of the plurality of finger holders.

17. The plurality of finger holders of claim 14, wherein a mean distance between central longitudinal axes of adjacent ones of the plurality of finger holders along the direction of the rotation axis is smaller than a width of the finger seat of either of the adjacent ones of the plurality of finger holders.

18. The plurality of finger holders of claim 14, wherein along the direction of the rotation axis, the radial finger seat of each of two adjacent ones of the plurality of finger holders at least partly overlaps with the finger bearing of the other of the two adjacent ones of the plurality of finger holders.

19. The plurality of finger holders of claim 14, wherein along the direction of the rotation axis, the radial finger seat of one of the plurality of finger holders at least partly overlaps with the axial finger bearing of each of two adjacent ones of the plurality of finger holders.

20. A method of manufacturing an auger finger assembly of claim 1, the method comprising steps of:
mounting the excenter shaft inside the rotatably driven tubular auger body such that its central longitudinal axis is parallel and excentric to the central rotation axis of the auger body;
mounting the plurality of finger holders adjacent to each other on the excenter shaft along the direction of the rotation axis, for individually mounting the plurality of auger fingers,
further mounting the plurality of finger holders, along the direction of the rotation axis, such that the radial finger seat of each of the plurality of finger holders at least partly overlaps with the axial finger bearing of at least one adjacent one of the plurality of finger holders.

* * * * *